(12) United States Patent
Battaglia et al.

(10) Patent No.: US 12,190,148 B2
(45) Date of Patent: Jan. 7, 2025

(54) SYSTEM AND METHOD FOR ASYNCHRONOUS BACKEND PROCESSING OF EXPENSIVE COMMAND LINE INTERFACE COMMANDS

(71) Applicant: Salesforce, Inc., San Francisco, CA (US)

(72) Inventors: Martin Battaglia, Buenos Aires (AR); Alvaro Gaita, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 414 days.

(21) Appl. No.: 17/520,086

(22) Filed: Nov. 5, 2021

(65) Prior Publication Data

US 2023/0093004 A1   Mar. 23, 2023

Related U.S. Application Data

(60) Provisional application No. 63/246,193, filed on Sep. 20, 2021.

(51) Int. Cl.
| | |
|---|---|
| *G06F 9/46* | (2006.01) |
| *G06F 9/451* | (2018.01) |
| *G06F 9/48* | (2006.01) |
| *G06F 9/54* | (2006.01) |

(52) U.S. Cl.
CPC .......... *G06F 9/4881* (2013.01); *G06F 9/451* (2018.02); *G06F 9/547* (2013.01)

(58) Field of Classification Search
CPC ......... G06F 9/4881; G06F 9/451; G06F 9/547
See application file for complete search history.

(56) References Cited

U.S. PATENT DOCUMENTS

| | | | |
|---|---|---|---|
| 10,338,964 B1 * | 7/2019 | Kancharla | G06F 9/5083 |
| 2015/0205634 A1 | 7/2015 | McPherson et al. | |

OTHER PUBLICATIONS

International Search Report and Written Opinion of the International Searching Authority directed to related International Patent Application No. PCT/US2022/14142, mailed May 16, 2022; 14 pages.
Zhao et al., "An autonomic Performance-Aware Workflow Job Management for Service-Oriented Computing," IEEE, 2010 Ninth International Conference on Grid and Cloud Computing, Nov. 2010; pp. 270-275.

* cited by examiner

*Primary Examiner* — Gregory A Kessler
(74) *Attorney, Agent, or Firm* — Sterne, Kessler, Goldstein & Fox P.L.L.C.

(57) ABSTRACT

Disclosed herein are system, method, and computer program product embodiments for providing asynchronous backend processing of complex, time consuming, and/or expensive jobs. A command line interface (CLI) provides a command interface between a user and a backend processing server. The CLI sends a job request to the backend server, which immediately replies to the request with a confirmation message that includes a job identifier. This response is sufficient to allow the CLI to end its wait for the job response. Meanwhile, the backend server carries out the job by parsing the job into component tasks according to a declaration file and assigns those different tasks to different work servers. The backend server functions as a master server, tracking the statuses of the different tasks and assigning out new tasks until the job is complete. An overall job status is provided to the CLI upon request by referencing the job identifier.

7 Claims, 6 Drawing Sheets

SYSTEM AND METHOD FOR ASYNCHRONOUS BACKEND PROCESSING OF EXPENSIVE COMMAND LINE INTERFACE COMMANDS

CROSS-REFERENCE TO RELATED APPLICATIONS

This application claims the benefit of U.S. Provisional Application No. 63/246,193, which was filed on Sep. 20, 2021, the contents of which are hereby incorporated by reference in their entirety.

BACKGROUND

Technical Field

One or more implementations relate to the field of Application Programming Interfaces (APIs), and more specifically, to asynchronous backend processing of expensive command line interface (CLI) commands.

Background Art

As connectivity between computer and mobile devices continues to develop, applications have been developed that communicate and share information. Commonly, applications may communicate via an Application Programming Interface (API). An API is a software interface offering a service to other programs to communicate data. APIs may have several different components, such as specifications, markdown documents, etc. that constitute part of an API's development. Further, there may be several computing jobs required in order to prepare an API for publishing and to publish the API. Some of these commands can be very expensive and time-consuming operations.

In order to issue job commands to a server that will ultimately perform the job, a command line interface (CLI) is often employed. A CLI is a well-known computer interface in which commands to a computer program are provided in the form of line of text. Similarly, the CLI outputs lines of text to a display using a standard output mechanism for reading/viewing by the user. A proxy usually functions as an intermediary between the CLI and the processing server. For particularly complex or work-intensive commands, the processing time can extend beyond one or more minutes. This typically is longer than the timeout time of the CLI or proxy. As a result, the proxy or CLI will issue a timeout response to the user even though the command is processing at the server. This is highly undesirable.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
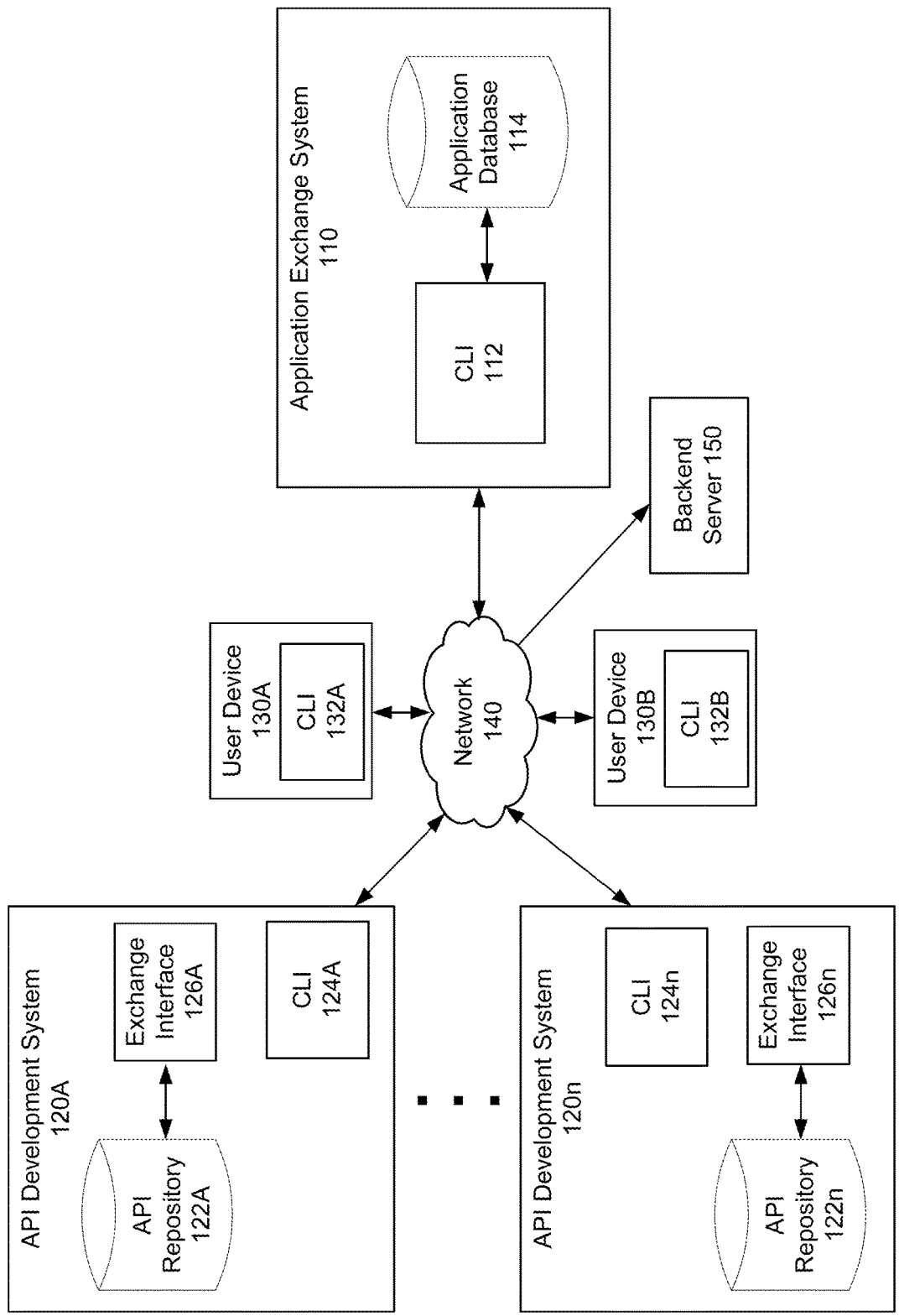
FIG. 1 illustrates a block diagram of an Application Programming Interface (API) command environment, according to some embodiments.

Provided herein are system, apparatus, device, method and/or computer program product embodiments, and/or combinations and sub-combinations thereof, for automatically discovering Application Programming Interfaces (APIs) and their dependencies.

In some embodiments, a backend service is configured to carry out time consuming and/or expensive operations in a coordinated fashion. Specifically, when a job request is received by a backend server, the server immediately responds to the requesting CLI with a job confirmation and job identifier. From the standpoint of the CLI, this response is sufficient to conclude the request and allow the CLI to continue processing other commands from a user. Meanwhile, the backend server begins to process the requested job.

Particularly in the API space, certain jobs may require several different component tasks be completed. These different tasks are specified in a process file referred to herein as a declaration file. Different declaration files may exist for many common and complex jobs. Each different declaration file defines the different tasks that are to be completed, and can also define the order in which those jobs must be completed, and other job-related parameters. Based on the requested job, the backend server identifies a proper declaration file that corresponds to the requested job. The backend server then parses the job according to the different tasks defined by the declaration file. In other words, the backend server determines how the job can be broken down into component tasks.

The server then enlists any number of work servers to carry out those different tasks. The backend server acts as a master server and, through the use of an intermediary message broker, communicates commands and statuses with the different work servers. Specifically, the master server causes the message broker to transmit the various tasks to different work servers. The message broker transmits status requests and work commands from the master server to the respective work server and transmits status updates and job completion messages from the work servers to the master server. In this manner, the job is performed in an asynchronous manner across many different servers.

Throughout the backend processing of the job, the master server may receive status requests from the CLI. Each status request will include the job identifier that was provided from the server to the CLI in response to the original job request. The server identifies the job based on the job identifier. The server then checks the status of the job either by requesting a status from the various work servers, or based on a stored progress of the job at the server. The server then replies to the status request with the status of the job.

Depending on the state of the work, the status request will either identify the job as being in progress, failed or completed. If the job status is "In Progress," the server may provide additional details, such as percentage complete, task(s) currently being performed, estimated time to completion, etc. If the job status is "Failed," the server may provide the reason for the job failure. If the job status is "Complete," then the server may provide the necessary data to verify the completion. For example, in the case of a publishing job, the server may specify the data that was cataloged (e.g., URL of API that was published, new version of the API that was cataloged, any data that was generated during the process, etc.).

In the manner described above, the CLI and the backend server operate asynchronously from each other. Specifically, the CLI provides the job command to the server and then, once the CLI receives the confirmation from the server, is able to move on with other processes, commands and requests. Meanwhile, the job is being carried out by the backend server. In other words, whereas normally a user would have to wait for the job command to complete and the result to be returned, with this configuration the user is able to carry on using the CLI while the original job is underway. Additionally, because a given job can be processed to completion before being placed in the Continuous Integration/Continuous Deployment (CI/CD) Pipeline, complex and expensive jobs will no longer cause processing backups or errors from their delay or failure.

Various embodiments of these features will now be discussed with respect to the corresponding figures.

FIG. 1 depicts a block diagram of an Application Programming Interface (API) command environment 100, according to some embodiments. API command environment 100 includes application exchange system 110, API development systems 120, user devices 130, and/or network 140.

Application exchange system 110 may be implemented using computer system 600 as further described with reference to FIG. 6. For example, application exchange system 110 may be implemented using one or more servers and/or databases. Application exchange system 110 may communicate with user devices 130 and/or API development systems 120 over network 140. Network 140 may include any combination of Local Area Networks (LANs), Wide Area Networks (WANs), and/or the Internet.

Application exchange system 110 may provide an application exchange platform. The application exchange platform may be an application marketplace or online store allowing consumers to install, implement, and/or download applications, which may include services, software, extensions, and/or programs. The application exchange platform may also be a cloud-based application marketplace. This may allow users to identify applications to implement into cloud-based computing platforms. The applications may have corresponding APIs with API specifications. Application exchange system 110 publishes the API specifications on the application exchange platform for viewing and/or use by consumers or implementers of the API.

The consumers or implementers may use a user device 130 to access application exchange system 110 via network 140. User device 130 may be a desktop personal computer, workstation, laptop, Personal Digital Assistant (PDA), smartphone, smartwatch, wearable device, augmented reality (AR) device, virtual reality (VR) device, and/or computer system 600. Using user device 130, users may access application exchange system 110 to view or browse applications, APIs, and/or API specifications. Application exchange system 110 may generate one or more graphical user interfaces (GUIs) for display on user device 130 to display data corresponding to the applications, APIs, and/or API specifications. Application exchange system 110 may store this data in application database 114. When a user device 130 accesses application exchange system 110, API specification data may be retrieved from application database 114, formatted, and transmitted to user device 130 for viewing. User device 130 may also install, implement, and/or download applications via the GUIs. The applications may utilize the APIs corresponding to the API specifications.

In order to allow a user to enter commands to carry out different jobs, such as API discovery, publishing, cataloging, etc., the application exchange system 110 includes a Command Line Interface (CLI) 112. The CLI may be in communication with the application database 114 and is an interface by which the user can enter commands, function calls, job requests, etc. In an embodiment, the CLI 112 is a text-based command prompt by which the user can type commands to be executed. The CLI transmits the commands to a backend server 150 via the network 140. In embodiments, the backend server 150 is a server cluster containing a plurality of servers.

The backend server 150 receives the job request from the CLI 112. The backend server 150 creates a job identifier associated with the job, and then transmits a confirmation message to the CLI 112. The confirmation includes at least a confirmation that the job was successfully received and will be processed and the job identifier. The job identifier functions as a reference number for the job so that the status of the job can be tracked by the user. The CLI 112 receives the confirmation message from the backend server 150 and logs the job identifier. This effectively concludes the operation from the standpoint of the CLI 112, allowing it to continue with other tasks and processing other commands.

Notably, other CLIs can also have access to the backend server and can function in substantially the same manner as CLI 112. For example, a CLI 124 at the API development system 120, or CLI 132 located at the user device 130 can each operate in the same manner as CLI 112.

Meanwhile, the backend server 150 performs the requested job. Specifically, the backend server includes a memory or other means for accessing a database of job declaration files. These files define how different jobs are to be processed, and how they can be parsed into different tasks. The backend server 150 then parses the job according to the declaration, and carries out the task using any number of work servers. This is described in further below with respect to FIG. 2.

One or more API development system 120 may provide APIs to be discovered and provided to application exchange system 110. An API development system 120 may be a computer system, a cloud-computing system, an enterprise system, a server, and/or other computer device allowing an API developer to draft APIs and their numerous different component files. In some embodiments, an API development system 120 may be implemented using computer system 600 as further described with reference to FIG. 6.

To provide the API, the customer need only store the various components of a given API within their API repository 122. In response to a command from CLI 112, the backend server 150 may, for example, identify and package APIs located on the API repository. However, whereas previous implementations would require the CLI 112 to wait for the job to complete before moving on to other tasks, the current implementation allows the CLI to accept additional commands from the user while waiting for the job to be processed by the server.

Figure 2:
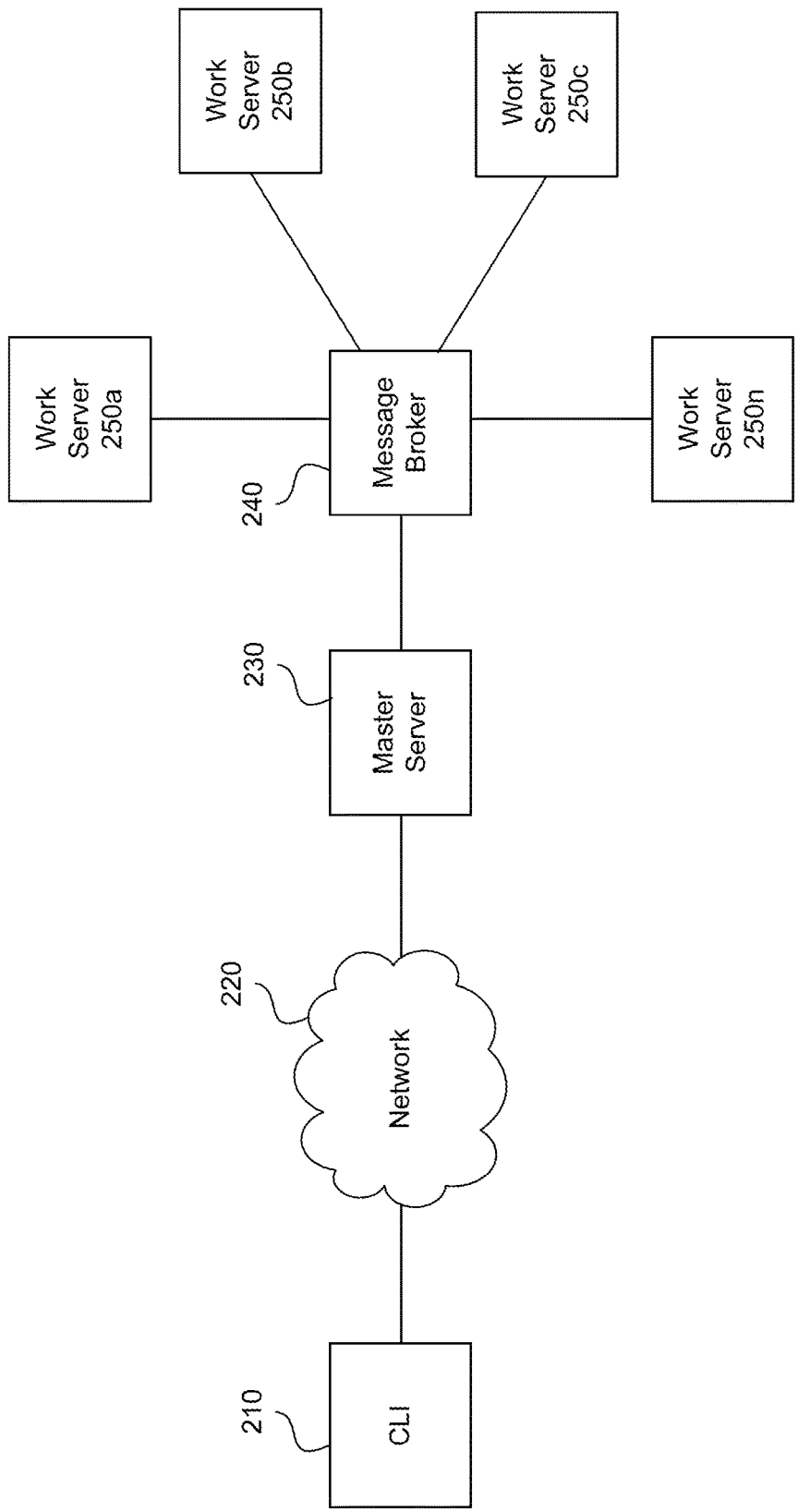
FIG. 2 illustrates a block diagram of an exemplary Application Programming Interface command environment, according to some embodiments.

FIG. 2 illustrates a block diagram of an exemplary Application Programming Interface command environment, according to some embodiments. As shown in FIG. 2, a CLI 210 is connected to a backend server (e.g., master server)

230 via a network 220. The master server 230 is connected to a plurality of work servers 250 by way of a message broker 240.

In operation, the CLI 210 transmits a job request to the master server 230 via the network 220. The master server receives the job request and generates a job identifier. The master server 230 then logs the job with the job identifier in a local database, and transmits a confirmation message to the CLI 210. According to embodiments, the confirmation message includes at least the job identifier, but could include other information such as time of start, estimated time to completion, job status, etc. The CLI 210 receives the confirmation message from the master server 230, which constitutes a response sufficient to end the wait by the CLI. This allows the CLI to continue processing other commands from a user.

In the meantime, the master server identifies the type of job from the request and then accesses a declaration file associated with the job type. According to different embodiments, the declaration file can be stored locally on the master server 230, on any of the work servers 250, or can be provided by the device associated with the CLI. Then, the master server 230 parses the job into component tasks according to the declaration file and assigns different work servers 250 to each of those tasks. In some embodiments, the declaration file may designate a particular order in which the different tasks must be performed. The master server 230 accounts for this when assigning the different tasks, and will withhold certain tasks that are to be performed later until earlier performed tasks are reported as complete.

The master server 230 transmits the task assignments to the work servers 250 via message broker 240. The message broker 240 is responsible for routing command and status messages between the work servers 250 and the master server 230. Therefore, the message broker receives the task assignments form the master server 230 and transmits them to the designated work servers 250. The work servers 250 respond to the assignments with confirmation messages that indicate that they have received the task and are performing it as requested. Throughout performance of the task, the work servers 250 may provide status updates or the master server 230 can request status updates from the work servers. These messages are all routed though the message broker 240.

When a task is completed at a particular work server 250, that work server 250 generates and transmits a "task complete" message that indicates whether the task was completed successfully or whether the task failed. In either scenario, the message includes all the necessary data for the master server to continue processing of the job, such as reason for failure or the data resulting from the completed task.

The master server 230 tracks task statuses and completions received from the various work servers 250 and continues assigning tasks until all the component tasks of the job have been completed. Once completed, the master server 230 stores the completed job. Throughout the job completion process, there are two primary means by which the CLI can be apprised of the status of the job and/or receive a completion notification of the job. In a first embodiment, the CLI 210 must transmit a command to the master server 230 via the network 220 requesting the job status. So that the master server 230 can identify the job, the job status request includes the job identifier. The master server 230 receives the request, identifies the job based on the job identifier, and responds to the request with the job status.

In a second embodiment, the CLI 210 "subscribes" to the master server 230. In different embodiments, the subscription to the master server 230 can be maintained by the master server 230 or the message broker 240. By being subscribed to the master server 230, the master server 230 will automatically transmit status messages associated with the job to the CLI 210. This requires the CLI to "listen" for any such messages. Additionally, in this embodiment, the master server 230 may transmit status messages associated with all jobs requested by the CLI 210.

Depending on the state of the job, the status included in the status message may be "job pending," "job completed successfully," or "job failed" message. In any of these scenarios, the master server 230 may include additional details, such as time lapsed, estimated time remaining, reason for failure, data of completed job, etc.

Figure 3:
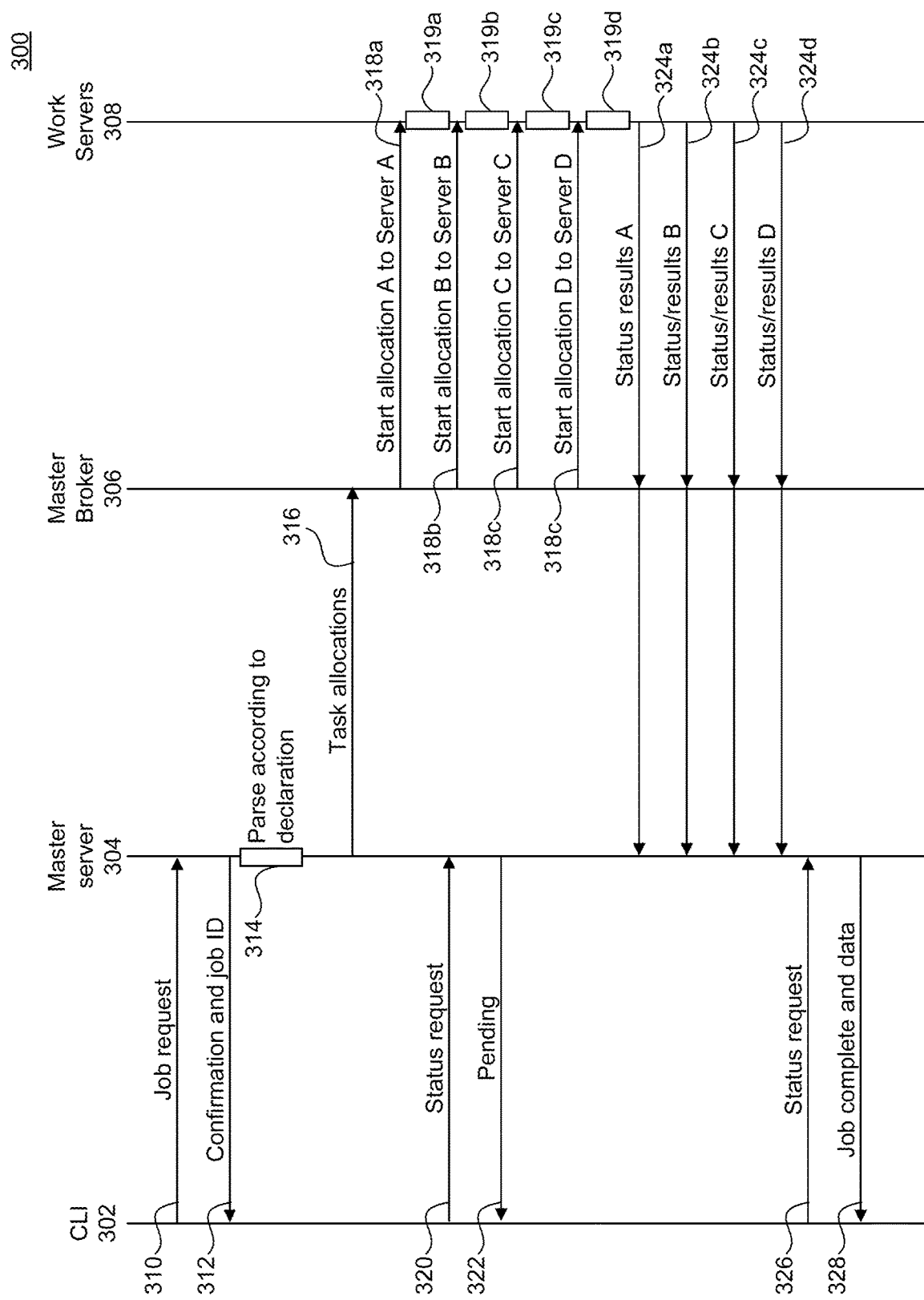
FIG. 3 illustrates a message flow diagram between a CLI, a master server, and other job contributors according to some embodiments.

FIG. 3 illustrates a message flow diagram between a CLI, a master server, and other job contributors according to some embodiments. Specifically, FIG. 3 illustrates an example flow of messages between the CLI 302, master server 304, message broker 306, and work servers 308.

As shown in FIG. 3, the CLI 302 transmits a job request message 310 to the master server 304. In response, the master server 304 transmits a confirmation message 312 that includes a job identifier. The master server 304 then parses the job according to a declaration file 314 into component tasks. The master server 304 transmits the task allocations 316 to the message broker 306, which forwards them to the various allocations to their respective work servers 308. For example, the message broker 306 forward task allocation A to work server A (318a), forwards task allocation B to work server B (318b), forwards task allocation C to work server C (318c), and forwards task allocation D to work server D (318d).

Upon receiving their different tasks, the work servers 308 being executing those tasks 319. Throughout the process of executing those tasks, upon receipt of a status request, or upon completion of the task, the work servers 308 transmit statuses and/or results 324 to the master server 304 via the message broker 306. The master server collects these status results from the work servers 308 and continues in this manner until all the tasks are complete and the job is finished or the job has failed.

At any time during the process, the CLI 302 may transmit a status request message 320 to the master server 304. The status request message includes at least the job identifier provided by the master server in message 312. This allows the master server 304 to identify the specific job being requested. In response to the status message, the master server identifies the job based on the job identifier included in the status message and then transmits a job status to the CLI 302. In response to status request message 320, the response will indicate that the job is still pending 322. However, when a status request message 326 is received from the CLI 302 after the job has completed, the master server 304 will identify the job based on the job identifier, determine that the job is complete, and then transmit a response message 328 that indicates that the job is complete and providing any data that may typically be provided upon job completion.

Figure 4:
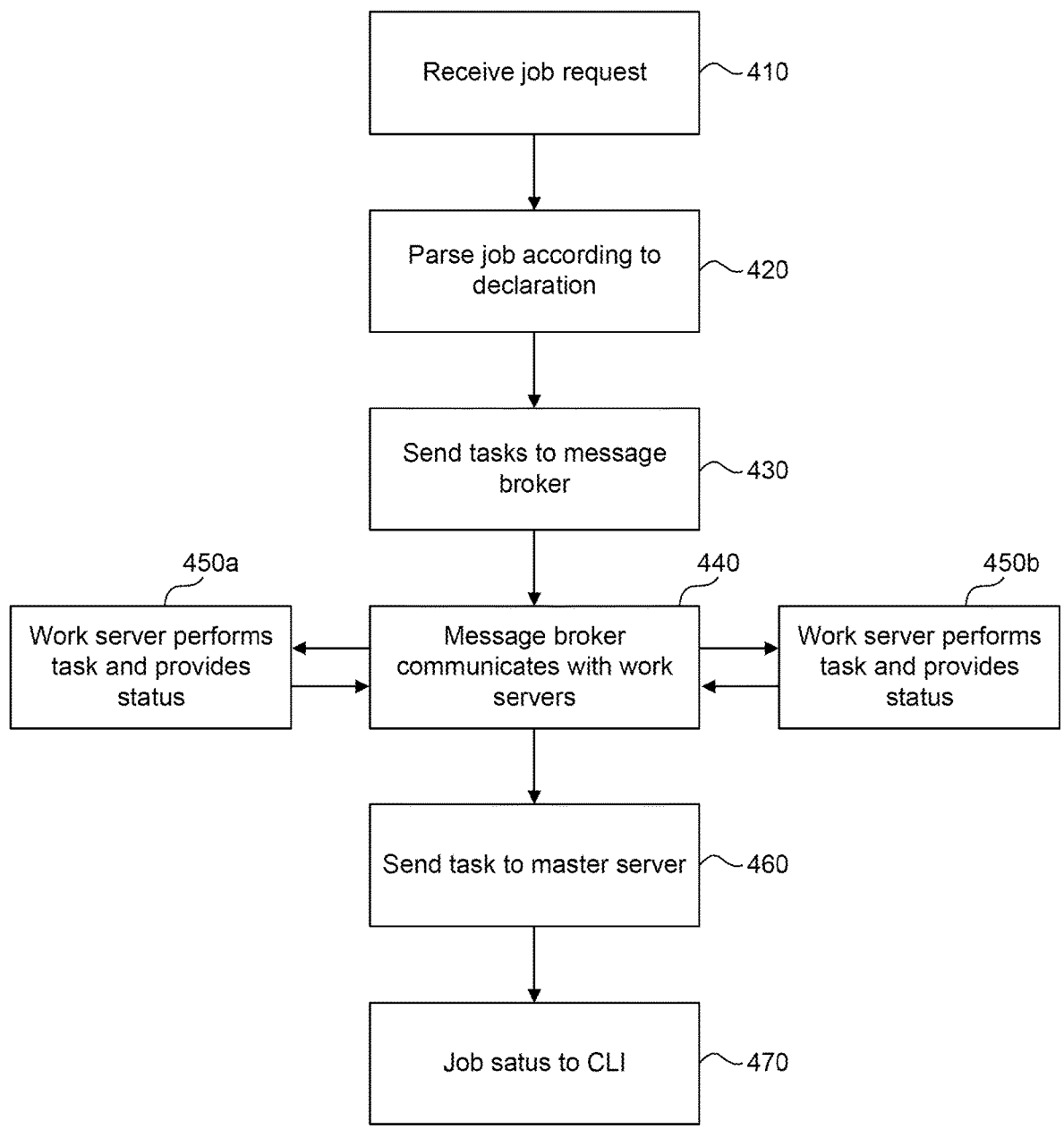
FIG. 4 illustrates a flowchart diagram of an exemplary method for carrying out complex commands, according to some embodiments.

FIG. 4 illustrates a flowchart diagram of an exemplary method for carrying out complex commands, according to some embodiments. As shown in FIG. 4, a backend server according to the above description first receives a job request 410 for a requesting device. According to embodiments, the requesting device is a user device and the request is made by way of a command line interface. The backend server retrieves a declaration file corresponding to the job being requested and parses the job 420 into component tasks according to the declaration file. Once the job has been parsed into component tasks, the backend server transmits task assignments to a message broker 430. The task assignments identify the various components that are to be carried out, and optionally can identify the specific servers designated to carry out those tasks. In an alternative embodiment, the backend server transmits the tasks to the message broker, and the message broker decides (whether unilaterally or in a coordinated fashion with the different work servers) to which work servers to assign the various tasks.

In step 440, the message broker communicates the various tasks to the different work servers. For example, in step 450a a first work server receives the task from the message broker and performs the task. Either occasionally on its own, or in response to a status request from the message broker, the first work server provides a status of the task to the message broker. Additionally, when the task is completed by the first work server, the work server will provide the completed status to the message broker, which includes the necessary results of the task to allow the job to be completed. Similarly, in step 450b, a second work server receives the task from the message broker and performs the task. Either occasionally on its own, or in response to a status request from the message broker, the first work server provides a status of the task to the message broker. Additionally, when the task is completed by the first work server, the work server will provide the completed status to the message broker, which includes the necessary results of the task to allow the job to be completed.

Throughout the process, the message broker communicates task statuses to the master server 460. These statuses can include various pending statuses, as well as "task completed" or "task failed" statuses. In both of the "task complete" and "task failed" statuses, additional information is provided, such as the reason for failure or the data of the completed task. Master server receives and collects the statuses of the various tasks in order to track an overall job status. Upon request, at predetermined intervals, or in response to a triggering event (such as job completion or job failure), the master server transmits the job status to the CLI 470.

Figure 5:
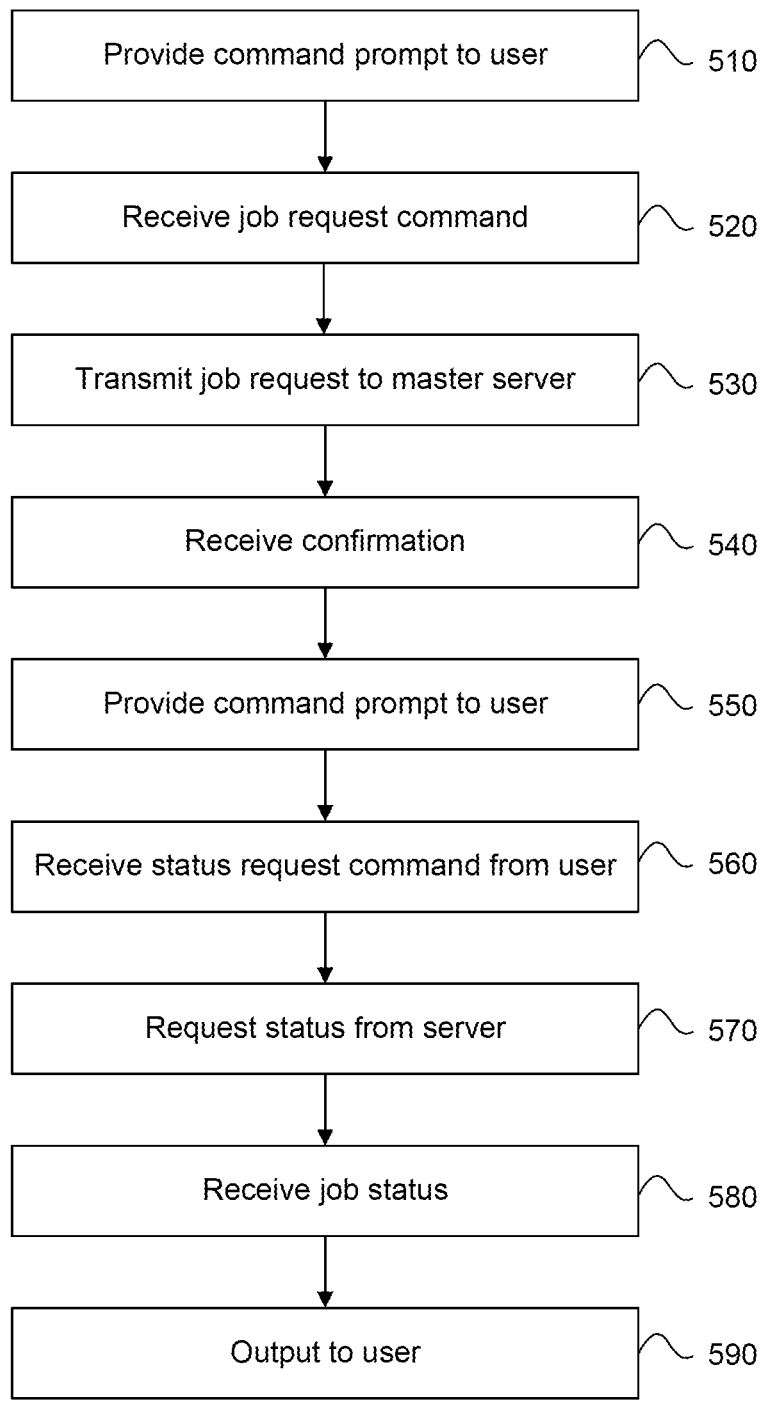
FIG. 5 illustrates a flowchart diagram of an exemplary method for requesting a job from a server by a CLI, according to some embodiments.

FIG. 5 illustrates a flowchart diagram of an exemplary method for requesting a job from a server by a CLI, according to some embodiments. As shown in FIG. 5, the CLI provides a command prompt the user 510. The command prompt functions as a text-based command interface by which the user can input commands. In the example of FIG. 5, the CLI receives a job request command 520 from the user. The CLI transmits the job request to a master server 530.

In response to transmitting the job request to the master server, the CLI receives a job confirmation message form the master sever 540. According to embodiments, the confirmation message at least indicates that the job has been received and also includes a job identifier by which to reference the requested job. Once the job confirmation message has been received, the CLI once again provides the command prompt to the user 550. In other words, the CLI does not wait for completion of the job, but rather allows for further user inputs.

Sometime after receiving the job confirmation, the user can check the status of the job by inputting a status request command. The CLI receives the status request command from the user 560. In response, the CLI transmits the status request to the server 570. In an embodiment, the status request includes at least the job identifier in order to allow the backend server to identify the job for which the status is being requested. In response, the CLI receives the status from the server 580. As discussed above, this status can identify the job as being in progress, failed, or completed. Upon receipt of the job status from the backend server, the CLI outputs the received information to the user 590. According to embodiments, the output is provided to the user via standard output on a video display.

Figure 6:
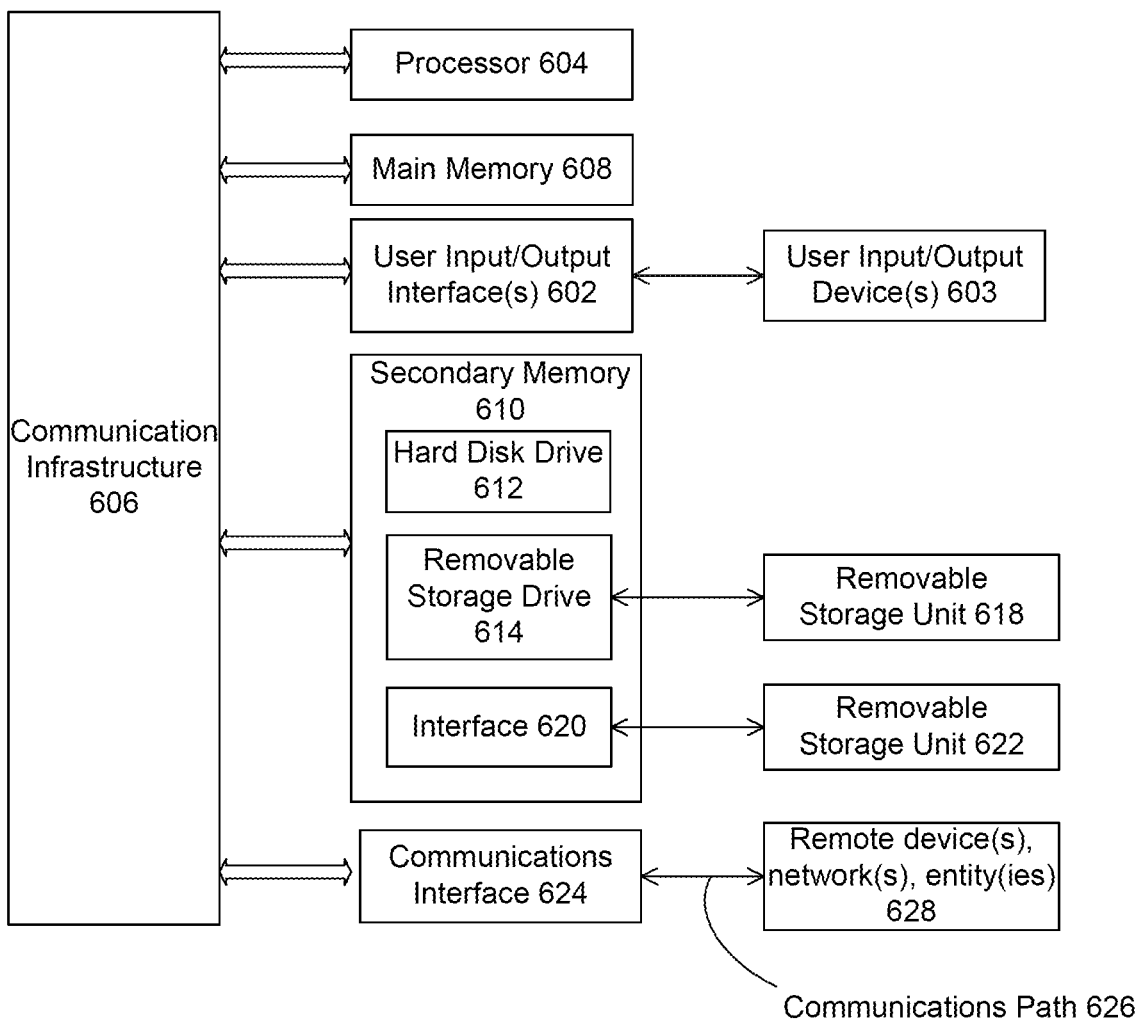
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A server, comprising:
    a communication interface configured to communicate with a user device and a plurality of work servers; and
    one or more processors configured to:
        receive a job request from the user device via the communication interface;
        parse a job into a plurality of component tasks based on a declaration file associated with the job of the received job request, the declaration file identifying the plurality of component tasks and a completion order of the plurality of component tasks;
        assign each of the plurality of component tasks to corresponding work servers;
        determine a job status of the job based on messages received from the corresponding work servers via the communication interface; and
        transmit the job status to the user device via the communication interface in response to the determining.

2. The server of claim 1, wherein the one or more processors are further configured to assign a job identifier to the job.

3. The server of claim 2, wherein the one or more processors are further configured to transmit a confirmation message to the user device in response to receiving the job request, the confirmation message including the job identifier.

4. The server of claim 1, further comprising a database that stores the declaration file,
    wherein the one or more processors are further configured to parse the job based on the declaration file.

5. The server of claim 1, wherein the one or more processors are further configured to transmit a plurality of job assignments to the corresponding work servers via a message broker.

6. The server of claim 5, wherein the one or more processors are further configured to receive status messages associated with the plurality of component tasks from the message broker.

7. The server of claim 6, further comprising a database, wherein the one or more processors are further configured to:
    store in the database the statuses associated with the received status messages;
    track a progress of the job based on the stored statuses; and
    determine that the job has been completed in response to all of the plurality of component tasks being complete.

* * * * *